April 29, 1952  B. S. AIKMAN  2,594,531
AUTOMOTIVE VEHICLE HOISTING APPARATUS
Filed Nov. 20, 1948
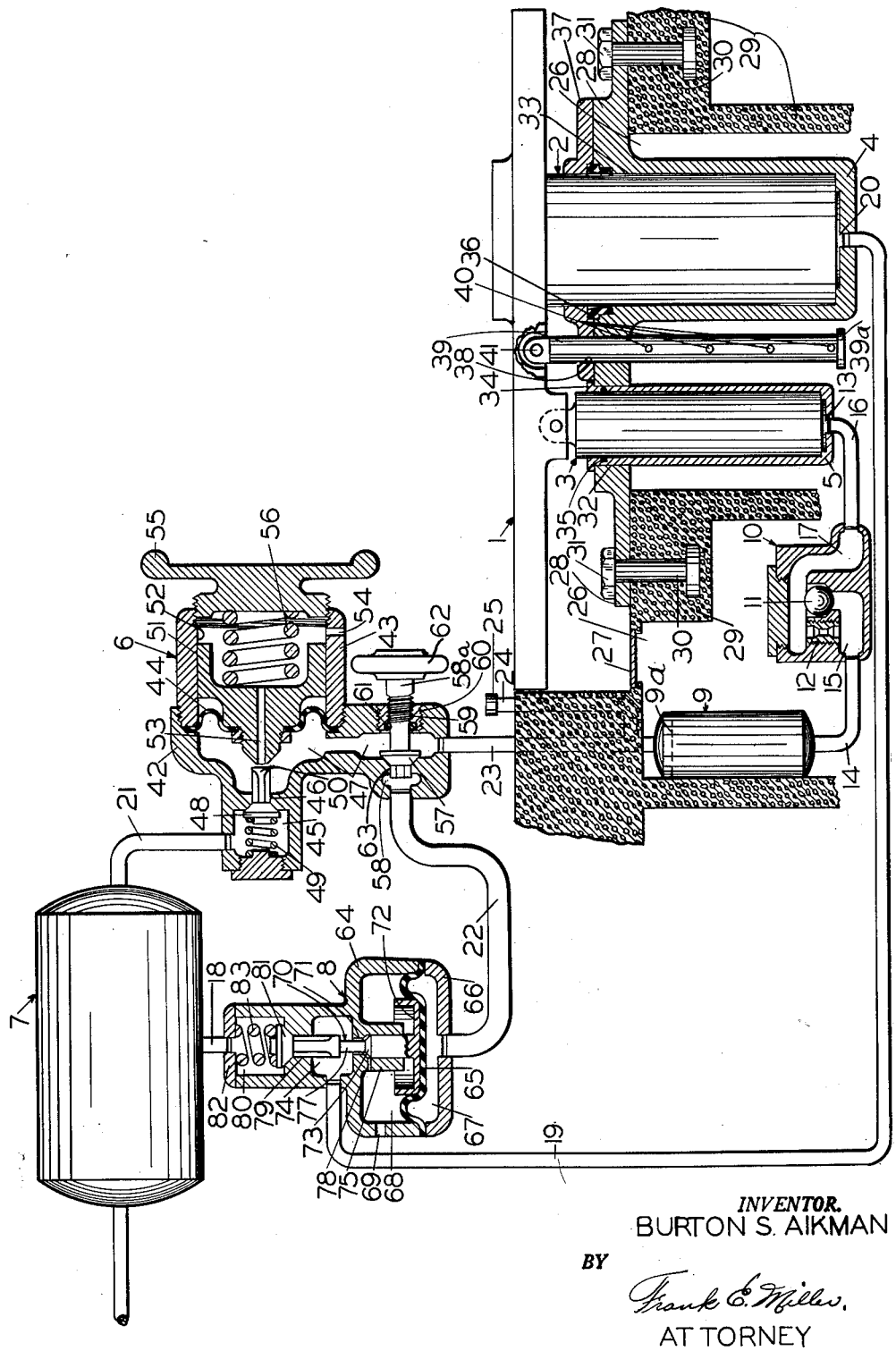
INVENTOR.
BURTON S. AIKMAN
BY
Frank E. Miller,
ATTORNEY Patented Apr. 29, 1952

2,594,531

UNITED STATES PATENT OFFICE 2,594,531

AUTOMOTIVE VEHICLE HOISTING APPARATUS

Burton S. Aikman, St. Petersburg, Fla., assignor to Westinghouse Air Brake Company, a corporation of Pennsylvania Application November 20, 1948, Serial No. 61,168

9 Claims. (Cl. 60—97)

1

This invention relates to hoisting apparatus and more particularly to the fluid pressure operated type for use in or around automotive vehicle filling stations and garages to raise a vehicle above the level of the floor or roadway to permit easy access to the chassis by workmen repairing or lubricating the same.

One object of the invention is to provide an improved automotive vehicle hoisting apparatus of the above type.

Another object of the invention is the provision of an automotive vehicle hoisting apparatus of the above type in which the amount of compressed fluid used in its operation is substantially less than that used by the present type of hoist.

Another object of the invention is to provide an automotive vehicle hoisting apparatus in which a major portion of the compressed fluid used in raising the hoist is recompressed in the lowering thereof.

Other objects and advantages will be apparent from the following more detailed description of the invention.

In the accompanying drawing, the single figure is a diagrammatic view, mainly in section, of a hoisting apparatus embodying the invention.

Description

As shown in the drawing, the hoisting apparatus comprises a hoisting platform 1 for supporting an automotive vehicle. To platform 1 is connected a main hoisting piston 2 and a supplementary hoisting piston 3 for raising and lowering said platform, said pistons being disposed in cylindrical casings 4 and 5, respectively. A manually operative control valve device 6 is provided to control flow of fluid under pressure from a storage reservoir 7 through a pipe 23 to the top of a liquid carrying reservoir 9 the bottom of which is connected to a chamber 13 formed in casing 5 at the lower face of the supplementary piston 3, as well as release of fluid under pressure therefrom, and an automatic relay valve device 8 adapted to operate in response to pressure of fluid acting on said supplementary piston is provided to control flow of fluid under pressure from said storage reservoir to the lower face of the main piston 2.

The reservoir 9 is partly filled with a suitable liquid such as oil, and a valve device 10 embodying a check valve 11 and a choke 12 by-passing said check valve is interposed in the connection, including pipes 14 and 16, between said reservoir and chamber 13, the check valve 11 being

2 arranged to permit a relatively rapid rate of flow of liquid from the reservoir 9 in the direction of pressure chamber 13 and the choke a slower rate of flow from said chamber in the direction of said reservoir to provide for a slow rate of descent of the platform 1 when fluid under pressure is vented from the top of the oil in said reservior in a manner hereinafter more fully explained.

A pipe 18 extending from the reservoir 7 is connected to the automatic relay valve device 8 while a pipe 19 extending from said valve device is connected to a pressure chamber 20 in the casing 4 at the lower side of piston 2.

A pipe 21 extending from the reservoir 7 is connected to the manually operative control valve device 6 while a pipe 22 extending from said control valve device is connected to the automatic relay control valve 8. A pipe 24 closed at one end by a cap 25 is connected to the pipe 23 and provides means for filling the reservoir 9 with liquid to some chosen level such as that indicated by the dotted line 9a.

Considering the parts of the equipment in greater detail, the platform 1, the cylindrical casings 4 and 5, the reservoir 9 and the valve device 10 all may be located in a concrete lined pit 26 located below the level of the floor or roadway over which the automotive vehicle may travel. The pit 26 may be closed by a manhole cover 27. The main hoisting piston casing 4 is provided with a flange 28 which is supported on and secured to a concrete foundation 29 forming walls of the pit 26, by means of bolts 30 imbedded in said concrete and nuts 31. The flange 28 is provided with two bores 32 and 33. The cylindrical casing 5 is mounted in the bore 32 and is provided with a collar 34 which rests on the flange 28 thereby maintaining said casing in the position shown.

Disposed in a suitable recess in the casing 5 in surrounding relation to the piston 3, as shown, is a seal 35 to prevent leakage of fluid under pressure along said piston. Disposed in a suitable recess in the casing 4 in surrounding relation to the piston 2, as shown, is a seal 36 to prevent leakage of fluid under pressure along said piston. The seal 36 is held in place by a securing element 37 fastened to the flange 28 by any suitable means (not shown).

The securing element 37 is provided with a bore 38 coaxial and coextensive with the bore 33, and slidably mounted in these bores is a safety supporting member 39 pivotally connected at its upper end to platform 1 by a pin 41 and extending into the pit 26. The member 39 is provided throughout its length with a plurality of spaced apart holes 40, one or more of which upon elevation of platform 1 to a greater or less degree as will be explained later is adapted to be disposed above the securing element 37. A pin (not shown) will be placed in the one of holes 40 above and closest to the top of element 37 for engagement therewith to insure that the platform will not drop in case of failure of the elevating fluid or to hold the platform in an elevated position when desired with no elevating fluid pressure present. A collar 39a on the lower end of member 39 is provided for contact with casing flange 28 to prevent pistons 2 and 3 moving out of their casing.

The manually operative control valve 6 comprises two casing sections 42 and 43 secured to each other by a screw-threaded connection and a diaphragm 44 clamped around its edge between said casing sections. The casing section 42 is provided with an inlet chamber 45 to which the pipe 21 is connected for supplying fluid under pressure from the reservoir 7 to said chamber. A bore 46 connects the chamber 45 to an outlet chamber 47 to which the pipe 23 is connected, the chamber 47 being formed between the casing section 42 and the diaphragm 44. Slidably mounted in the bore 46 is the fluted stem of a valve 48 contained in chamber 45 for controlling communication between the inlet chamber 45 and the outlet chamber 47. Disposed in the inlet chamber 45 is a spring 49 acting on the valve 48 for urging it to its seated position. The end of the stem of valve 48 extends into the chamber 47 and constitutes an exhaust valve 50 arranged to seat against one end of a diaphragm follower 51 around a passage 53 extending axially through said follower and being constantly open to atmosphere via a port 54 in the casing. The follower 51 is slidably mounted in a bore 52 in the casing section 43 and extends through the diaphragm 44 for cooperation with valve 50 and is secured to said diaphragm centrally thereof for movement therewith. A hand wheel 55 has a screw-threaded connection with casing section 43 and disposed between and engaging at opposite ends the diaphragm follower 51 and said hand wheel is a pressure regulating spring 56. With the hand wheel 55 in the position in which it is shown in the drawing for permitting the platform 1 to assume its lowermost position as will be hereinafter described, the pressure of spring 56 on diaphragm follower 51 is reduced sufficiently to permit said follower to assume the position in which it is shown in the drawing and in which the valve 50 is open for opening chamber 47 to atmosphere through bore 53 and port 54.

The manually operative control valve device 6 further comprises a valve 57 for controlling communication between the chamber 47 and a chamber 58 formed in the casing section 42 to which the pipe 22 is connected. The valve 57 is provided with a stem 58a extending through and having screw-threaded engagement with a bore 59 in a bushing 60 provided in the casing section 42. Clamped between the casing section 42 and bushing 60 is a sealing ring 61 having sealing contact with stem 58a to prevent leakage of fluid under pressure along said stem. The stem 58a is provided at its outer end with a hand wheel 62 whereby the valve 57 may be moved into and out of engagement with a seat formed at the right-hand end of a bore 63 connecting chambers 47 and 58, for thereby controlling communication between said chambers.

The automatic relay valve device 8 comprises a casing section 64 and a diaphragm 65 clamped around its edge between said casing section and a cover 66. Two chambers 67 and 68 are formed at opposite sides of the diaphragm 65. The pipe 22 is connected to the chamber 67 while the chamber 68 is open to atmosphere through a port 69 in the casing section 64. A plunger 70 slidably extending through a bore 71 in the casing section 64 has at one end a follower head 72 in contact with said diaphragm and at the opposite end an exhaust valve 73 arranged to cooperate with a seat in said casing section for controlling communication between a chamber 74 in said casing section, to which the pipe 19 is connected, and the atmospheric chamber 68. The plunger 70 is provided with a reduced portion 77 extending from the valve 73 through the bore 71 into the chamber 74 and being of a diameter sufficiently less than the diameter of said bore to permit flow of fluid under pressure from the chamber 74 to the atmospheric chamber 68 via a port 78 open to said chamber.

The casing section 64 has a bore 79 coaxial with the bore 71 and connecting the chamber 74 with a chamber 80 formed in said casing section to which the pipe 18 is connected. Slidably mounted in the bore 79 is the fluted stem of a valve 81 for controlling communication between chambers 74 and 80, said stem extending into chamber 74 into contact with the upper end of the reduced portion 77 of the plunger 70. The outer end of chamber 80 is closed by a cap 82, and disposed between said cap and the valve 81 is a spring 83 for urging said valve to its seated position.

Operation

Let is be assumed that reservoir 7 is charged with fluid at a desired pressure from any suitable source (not shown) and that the reservoir 9 is filled with liquid to a desired level. Let it further be assumed that the hand wheel 55 is backed off sufficiently to relieve pressure on spring 56 to permit unseating of valve 50 and hence opening to atmosphere of chamber 47 and the space above the liquid in reservoir 9 as a result of which the pressure in chamber 13 acting on the pressure face of the auxiliary hoist piston 3 will be substantially that of atmosphere. Let it also be assumed that hand wheel 62 is operated to open valve 57 whereby diaphragm chamber 67 will also be open to atmosphere due to which the spring 83 will be seating valve 81 and unseating valve 73 whereby chamber 20 below the main hoist piston 2 will also be open to atmosphere. With both hoist pistons 2 and 3 subject on their lower or pressure faces to substantially atmospheric pressures the hoist platform will assume its lowermost position in which it is shown in the drawing.

When it is desired to hoist an automotive vehicle or the like, the vehicle is driven upon the platform 1. The hand wheel 55 is then rotated in a direction to actuate spring 56 and thereby the diaphragm 44 and the diaphragm follower 51 in a direction to the left from that shown on the drawing until said follower seats against the elongated stem of valve 48, thus closing exhaust passage 53 from chamber 47. Further rotation of the hand wheel 55 in the same direction then acts through follower 51 to force valve 48 from its seat against the force of the spring 49 thereby permitting fluid under pressure from reservoir 7 to flow past valve 48 to chamber 47 and thence past valve 57 to diaphragm chamber 67 and also through pipe 23 to the top of the oil in the reservoir 9. The fluid under pressure thus provided in diaphragm chamber 67 promptly deflects diaphragm 65 to seat valve 73 and unseat valve 81 against spring 83 whereupon fluid at the pressure in reservoir 7 becomes effective through pipe 19 in chamber 20 and therein acts on the main hoist piston 2 in a direction to raise the platform 1 and the load thereon, it being desired to point out however that the force thus produced, by itself, is insufficient to effect the raising operation. The fluid under pressure supplied through pipe 23 to reservoir 9 acts on the liquid therein to force liquid therefrom past the check valve 11 to pressure chamber 13 wherein it acts on the auxiliary hoist piston 3 to create a raising force which supplements that acting on the main hoist piston 2 for raising the platform 1 and the load thereon.

The pressure of fluid provided past the open valve 48 in chamber 47 acts on the left-hand face of the diaphragm 44 in opposition to the force of the spring 56 and when the pressure in chamber 47 slightly exceeds the pressure of said spring, the diaphragm 44 and diaphragm follower 51 are deflected in a direction to the right from that shown on the drawing against spring 56 permitting spring 49 to seat the inlet valve 48 which terminates flow of fluid under pressure to chamber 47 and the top of the oil reservoir 9. If the pressure of fluid thus provided in reservoir 9 is not adequate to provide a supplemental lifting force in chamber 13 on the auxiliary piston 3 to lift the platform 1 and load thereon, the hand wheel 55 will be turned in further against spring 56 to actuate said spring to again unseat the supply valve 48 for increasing the pressure of fluid in reservoir 9 and hence the pressure of liquid in chamber 13 on piston 3. By suitable adjustment of hand wheel 55 the pressure of fluid in chamber 47 and hence of liquid in chamber 13 on the auxiliary piston may be increased to the degree necessary to provide the force supplementary to that provided by piston 2 to raise the platform 1 and the load resting thereon. When the platform and load thereon are thus elevated to the desired degree rotation of hand wheel 55 is stopped whereupon the supply valve 48 will close upon further increase in pressure in chamber 47 sufficient to deflect diaphragm 44 and follower 51 against spring 56.

From the above it will be apparent that the main elevating force is provided by the full pressure of fluid in the reservoir 7 acting on the main hoist piston 2, and whatever supplemental elevating force is necessary is provided by the auxiliary hoist piston 3. The degree of supplemental force will obviously vary in accordance with the load on the platform, but whatever is necessary may be obtained by suitable adjustment of hand wheel 55. In other words, regardless of the load placed on platform 1, the operator need only turn wheel 55 until the load and platform become elevated as desired and then cease turning of said wheel.

In practice the elevation of platform 1 will substantially follow turning of the hand wheel 55 and the elevation may be effected in steps or be continuous and may be limited to any desired degree by stopping turning of said wheel, or may be complete, as desired.

To lower the platform 1, the hand wheel 62 is first operated to close the valve 57. The fluid under pressure in chambers 58 and 67 and in pipe 22 is thus trapped and acting on diaphragm 65 maintains the exhaust valve 73 closed and the inlet valve 81 open.

After the valve 57 is closed the hand wheel 55 is rotated in a direction opposite to that which it was rotated for raising the platform 1 to permit fluid under pressure acting in chamber 47 on diaphragm 44 to deflect said diaphragm and thereby the diaphragm follower 51 in a direction to the right from that shown on the drawing away from the exhaust valve 50 whereupon fluid pressure from chamber 47 and from the top of the oil reservoir 9 is released to atmosphere through the bore 53 in said follower and the port 54 in the casing section 43. When fluid under pressure is sufficiently vented from the chamber 47 to reduce the pressure therein to a value slightly below the force of the spring 56, said spring will move the diaphragm 44 and the diaphragm follower 51 in a direction to the left from that shown on the drawing until the exhaust valve seats which prevents further venting of fluid under pressure from chamber 47 and the top of the oil reservoir 9.

The venting of fluid under pressure from the top of the oil reservoir 9 reduces the pressure of the oil acting in chamber 13 on the lower face of the piston 3 and thereby the force acting to hold the platform 1 in its raised position. Therefore the weight of the platform 1 and of the load thereon is effective to cause said platform and the pistons 2 and 3 to move downwardly which forces oil from chamber 13 through pipe 16, chamber 17 in the valve device 10, the choke fitting 12 (the ball check valve 11 being closed by the reverse flow), to chamber 15 and thence through pipe 14 to the oil reservoir 9, and air from the chamber 20 will at the same time be forced back through pipe 19 to chamber 74 and thence past the open valve 81 to chamber 80 and through pipe 18 into reservoir 7. The platform 1 will thus descend until the reduced pressure acting on the oil in the oil reservoir 9 combined with the force of fluid under pressure acting in chamber 20 is sufficient to balance the weight of the platform 1 and load thereon.

When the above described equilibrium is reached the platform 1 will come to rest at some position below that which it previously occupied determined by the amount of rotation imparted to the hand wheel 55 in the direction opposite to that which it was previously rotated in raising the platform.

To cause the platform 1 to continue its descent to a lower position, the hand wheel 55 is further rotated in the direction opposite to that which it was rotated in raising said platform. The platform will again descend as described above until the reduced pressure acting on the oil in the oil reservoir 9 combined with the force of fluid under pressure acting in chamber 20 is sufficient to balance the downward force acting on said platform at which time the platform will again come to rest. It will thus be seen that the platform 1 may be lowered in successive steps until it again reaches the level of the floor or roadway at which time the automotive vehicle may be removed from said platform. In practice the platform 1 will descend substantially with the backing off of wheel 55, so, if desired, the descent may be continuous, as will be apparent.

After the platform 1 reaches the level of the floor or roadway, the hand wheel 62 is rotated in a direction to open valve 57 which permits the trapped fluid under pressure in chambers 58 and 67 and pipe 22 to flow to the chamber 47 and thence to the atmosphere. Upon this release of fluid under pressure from chamber 67 the spring 83 acting on the valve 81 will move said valve downward in unison with the diaphragm 65 and the plunger 70 until said valve seats and the valve 73 is open. The seating of valve 81 acts to hold the fluid under pressure in reservoir 7 while opening the exhaust valve 73 establishes a fluid pressure release communication from chamber 74 to atmosphere past valve 73 through port 78, chamber 68 and port 69 for venting the remaining fluid under pressure present in the pipe 19 and chamber 20. With the valve 57 open the apparatus is in condition for another raising operation by mere turning of hand wheel 55, in the manner above described.

*Summary*

It will now be seen that I have provided a hoisting apparatus embodying means operable by descent of an elevated load for recompressing, for reuse, the major amount of fluid under pressure required for effecting a raising operation, thereby minimizing the quantity of fluid under pressure consumed by operation of the apparatus and requiring replacement.

Having now described my invention, what I claim as new and desire to secure by Letters Patent, is:

1. A fluid pressure operated hoisting apparatus comprising a hoisting member for lifting a load, a pair of fluid pressure motors operable in unison to raise said member, a source of fluid under pressure, a liquid reservoir connected to one of said motors, a manually operated control device operable to supply fluid under pressure to said liquid reservoir and to release fluid under pressure from said liquid reservoir to control operation of one of said motors, relay means operable to open a communication from said source to the other of said motors, and a manually operable valve device operative, only when said manually operated control device is operated to supply fluid under pressure to said liquid reservoir, to effect operation of said relay means, and also operative to maintain said relay means operative notwithstanding a reduction in the fluid pressure acting in said liquid reservoir, and means operative by said member for recompressing through said communication the fluid under pressure acting on said other motor when the fluid pressure force operating said one motor is reduced.

2. A fluid pressure operated hoisting apparatus comprising a hoisting member for lifting a load, a reservoir charged with fluid under pressure, a pair of motors connected to said member and operable in unison by fluid under pressure to raise said member, manually operated means operable to supply fluid under pressure to one of said motors, other means for supplying fluid under pressure from said source to the other of said motors, manually operative valve means for rendering said other means operative in response to operation of said manually operated means and for maintaining said other means in an operated position upon operation of said manually operated means to reduce said fluid pressure force acting on said one motor, and means operative by said hoisting member, in response to operation of said manually operated means to reduce the fluid pressure force acting on said one motor, to recompress the fluid under pressure acting on said other motor back into said reservoir.

3. A fluid pressure operated hoisting apparatus comprising a hoisting member for lifting a load, a reservoir charged with fluid under pressure, a pair of motors connected to said member and operable by fluid under pressure in unison to raise said member, means operable by fluid under pressure to establish a fluid pressure communication between said reservoir and one of said motors, means operable manually to supply fluid under pressure to act on the other of said motors and to establish a fluid pressure communication between said reservoir and said fluid pressure operable means to effect operation thereof, said manually operated means comprising a self-lapping valve means for controlling the pressure of fluid on said other motor and the flow of fluid under pressure to said fluid pressure operable means, and a manually operated valve disposed between said self-lapping means and said fluid pressure operable means and operative to close said communication to said fluid pressure operable means to permit a reduction in pressure of said fluid on said other motor while said fluid pressure operable means is maintained in an operated position establishing said fluid pressure communication between said main reservoir and said one motor to permit a flow of fluid under pressure from said one motor to said reservoir in response to descent of said hoisting member effected by said reduction in pressure of fluid on said other motor.

4. A fluid pressure operated hoisting apparatus comprising a hoisting member for lifting a load, a fluid pressure reservoir charged with fluid under pressure, a pair of motors connected to said member and operable by fluid under pressure in unison to raise said member, relay means operable by fluid under pressure to establish a fluid pressure communication between said reservoir and one of said motors and operable upon release of fluid under pressure to establish a communication between said one motor and atmosphere, a manually operated control valve, a reservoir containing liquid, a check valve and a choke in by-passing relation thereto, said manually operated control valve, liquid reservoir and check valve being respectively connected in series relation between said fluid pressure reservoir and the other of said motors, said manually operated control valve comprising a self-lapping valve means operable to control flow of fluid under pressure from said fluid pressure reservoir to said liquid reservoir and said relay means and from said liquid reservoir and said relay means to atmosphere, and a manually operated valve disposed between said self-lapping valve means and said relay means operable to control the flow of fluid under pressure between said self-lapping valve and said relay means independently of the flow of fluid under pressure between said liquid reservoir and said self-lapping valve means to cause said relay means to maintain open said fluid pressure communication between said main reservoir and said one motor, while said self-lapping valve means is operated to release fluid under pressure from said liquid reservoir, to permit a gradual flow of liquid from said other motor to said liquid reservoir through said choke and flow of fluid under pressure from said one motor to said reservoir through said communication maintained open by said relay means, in response to descent of said hoisting member effected by the flow of liquid from said other motor.

5. A fluid pressure operated hoisting apparatus comprising a hoisting member for lifting a load, a reservoir charged with fluid under pressure, a main motor and a supplementary motor both being operatively connected to said hoisting member and operable by fluid under pressure in unison to raise said load, a reservoir containing liquid and having a fluid pressure communication extending from the bottom thereof and connected to said supplementary motor, relay means operable to establish a fluid pressure communication between said reservoir and said main motor, self-lapping valve means having a first fluid pressure communication connected to the top of said liquid reservoir and a second fluid pressure communication connected to said relay means and operative manually to supply fluid under pressure from said reservoir to said first and second fluid pressure communications and also operative to release such fluid under pressure, a manually operated cut-off valve disposed in said second fluid pressure communication and operable to close said communication to permit release of fluid under pressure from said liquid reservoir without releasing fluid under pressure from said relay means by operation of said self-lapping valve means for thereby enabling said relay means to maintain open said communication between said reservoir and said main motor, said main motor comprising means operable by descent of said member to displace fluid under pressure acting in said main motor through the last mentioned communication into said main reservoir.

6. A fluid pressure operated hoisting apparatus comprising in combination, a hoisting member for lifting a load, two hoisting pistons connected to said member adapted to be operated by fluid under pressure for actuating same to shift said load, operator's control means for supplying fluid under pressure to and for releasing fluid under pressure from one of said pistons, a source of fluid under pressure, relay means responsive to fluid under pressure to open said source to the other of said pistons and responsive to release of such fluid under pressure to disconnect said other piston from said source and open it to atmosphere, and other operator's control means for selectively subjecting said relay means to pressure of fluid provided by the first named operator's control means or for bottling up fluid under pressure acting on said relay means.

7. A fluid pressure hoisting apparatus comprising a hoisting member for lifting a load, a reservoir charged with fluid under pressure, a main fluid pressure motor and a supplementary fluid pressure motor each operatively connected to said hoisting member but incapable of raising said load without the assistance of the other, self-lapping valve means for supplying fluid under pressure from said reservoir to said supplementary motor, a check valve operable to establish a fluid pressure communication between said reservoir and said main motor, fluid pressure responsive means operable to open said check valve, and a manually operable valve operative to an open position to render said fluid pressure responsive means responsive to operation of said self-lapping means to permit simultaneous supply of fluid under pressure to and from said motors, said check valve being operable upon releasing fluid under pressure from said supplementary motor with said manually operative valve closed to permit recompressing the fluid under pressure acting on said main motor into said reservoir.

8. A fluid pressure hoisting apparatus comprising a hoisting member for lifting a load, a reservoir charged with fluid under pressure, a main fluid pressure motor and a supplementary fluid pressure motor each operatively connected to said hoisting member but incapable of raising said load without the assistance of the other, a first fluid pressure communication connecting said reservoir and said supplementary motor, a self-lapping valve means for controlling the flow of fluid under pressure through said first communication, a second fluid pressure communication connecting said reservoir and said main motor, an exhaust valve for exhausting said second communication to atmosphere, a check valve operable to control flow of fluid under pressure through said second communication, fluid pressure operated means operable in response to operation of said self-lapping valve means to open said check valve and close said exhaust valve, manually operable valve means for rendering said fluid pressure responsive means non-responsive to the operation of said self-lapping means, and means for limiting the rate of releasing fluid under pressure from said supplementary motor to provide for a slow descent of said hoisting member, said check valve permitting said main motor to recompress the fluid under pressure acting thereon upon said self-lapping valve means releasing fluid under pressure from said supplementary motor at a time when said manually operable valve means renders said fluid pressure responsive means non-responsive to operation of said self-lapping valve means.

9. A fluid pressure operated hoisting apparatus comprising in combination, a hoisting member for lifting a load, two hoisting pistons connected to said member adapted to be operated by fluid under pressure for actuating same to lift said load, a source of fluid under pressure, means operable to provide for flow of fluid under pressure in both directions between said source and one of said pistons, and a self-lapping operator's control means for supplying fluid under pressure to and for releasing fluid under pressure from the other of said pistons, said operator's control means comprising a movable abutment, a valve operable by said abutment to supply fluid under pressure from said source to one side of said abutment to move said abutment in one direction, a manually operable member for moving said abutment in the opposite direction to open said valve, and a resilient connection between said abutment and said manual member.

BURTON S. AIKMAN.

REFERENCES CITED

The following references are of record in the file of this patent:

UNITED STATES PATENTS

| Number | Name | Date |
|---|---|---|
| 446,799 | Thorpe | Feb. 17, 1891 |
| 1,231,257 | Herr | June 26, 1917 |
| 1,590,848 | Nilson | June 29, 1926 |
| 1,619,474 | Hubbard | Mar. 1, 1927 |
| 2,103,274 | Sanford | Dec. 28, 1937 |
| 2,151,057 | Suth | Mar. 21, 1939 |

FOREIGN PATENTS

| Number | Country | Date |
|---|---|---|
| 87 | Great Britain | Jan. 10, 1863 |
| 242,925 | Great Britain | Nov. 19, 1925 |